(12) United States Patent
Greenberg et al.

(10) Patent No.: US 7,171,651 B1
(45) Date of Patent: Jan. 30, 2007

(54) METHOD AND SYSTEM FOR REMOTELY CONTROLLING THE REPORTING OF EVENTS OCCURRING WITHIN A COMPUTER SYSTEM

(75) Inventors: Steven M. Greenberg, Seattle, WA (US); Jeffrey E. Larsson, Kirkland, WA (US); Kevin J. Fischer, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 547 days.

(21) Appl. No.: 10/304,282

(22) Filed: Nov. 26, 2002

(51) Int. Cl.
 G06F 9/44 (2006.01)

(52) U.S. Cl. .................... 717/120; 717/121; 717/154

(58) Field of Classification Search ............. 709/231; 702/183; 717/120–160
 See application file for complete search history.

(56) References Cited

U.S. PATENT DOCUMENTS

| 5,740,354 | A | 4/1998 | Ben-Natan et al. .... 395/183.21 |
| 5,790,779 | A | 8/1998 | Ben-Natan et al. .... 395/183.15 |
| 6,356,887 | B1 | 3/2002 | Berenson et al. ............. 707/2 |
| 2002/0078142 | A1 | 6/2002 | Moore et al. ............... 709/203 |
| 2004/0030796 | A1* | 2/2004 | Cooper et al. ............. 709/231 |
| 2005/0137832 | A1* | 6/2005 | Yemini et al. .............. 702/183 |

OTHER PUBLICATIONS

Khosh-Khui, S.A., "Electronic Error Reporting Via Internet In The VAX Environment," *OCLC Systems & Services*, 1995, vol. 11, No. 1, p. 27-38.

Kerchner, D.J., Overlapping Development: The Continuous Maintenance Phase, Sessions Presented At Northcon/85 Conference Record, Oct. 1985, p. 5/1-1-6.

Yamada, S., Osaki, S., "A Reliability model On A Software Error Detection Process," *Transactions of the Information Processing Society of Japan*, May 1983, vol. 24, No. 3, p. 376-378.

Murthy, S., "How To Collect More Reliable Defect Reports," Nineteenth Annual Pacific Northwest Software Quality Conference, Oct. 2001, p. 279-293.

Morin, R., "Distributed Quality Assurance," *UNIX Review*, Sep. 1993, vol. 11, No. 9, p. 107-108.

(Continued)

*Primary Examiner*—Kakali Chaki
*Assistant Examiner*—Mark P. Francis
(74) *Attorney, Agent, or Firm*—Merchant & Gould

(57) ABSTRACT

A method and system are provided for remotely controlling the reporting of events occurring within a computer. A remote control file identifying the events and conditions under which the events should be reported is periodically retrieved at a client computer. When an event occurs within a client computer, the remote control file is searched for data indicating that the event should be recorded. If data is located within the remote control file indicating that the event should be reported, data describing the event is collected. The collected data then may be subsequently reported. The remote control file may also include data identifying the type of data to be collected and a date and time after which data for a particular event should not be collected or reported.

19 Claims, 9 Drawing Sheets

OTHER PUBLICATIONS

U.S. Appl. No. 09/559,123, entitled "Method and Apparatus for Displaying Computer Program Errors As Hypertext," filed Apr. 26, 2000; Inventor: William R. Softky.

U.S. Appl. No. 09/570,664, entitled "Method and System for Categorizing Failures of A Program Module," filed May 15, 2000; Inventors: Kirk A. Glerum, Matthew J. Ruhlen, Eric A. LeVine, Rob M. Mensching, Charles S. Walker.

U.S. Appl. No. 09/570,621, entitled "Method and System for Handling An Unexpected Exception Generated By An Application," filed May 15, 2000; Inventors: Matthew J. Ruhlen, Michael R. Maracelais, Brian T. Hill.

U.S. Appl. No. 09/570,825, entitled "System and Method for Handling A Failure Reporting Conversation," filed May 15, 2000; Inventors: Matthew J. Ruhlen, Kirk A. Glerum.

U.S. Appl. No. 09/571,629, entitled "Method and System for Reporting A Program Failure," filed May 15, 2000; Inventors: Kirk A. Glerum, Matthew J. Ruhlen, Eric A. LeVine, E. Peter Oosterhof.

U.S. Appl. No. 09/596,591, entitled "Method and System for Cyclic Crash Prevention During Application Startup," filed Jun. 19, 2000; Inventors: Michael R. Maracelais, Brian T. Hill, Eric A. LeVine, Steven Miles Greenberg.

U.S. Appl. No. 09/588,165, entitled "Method and System for Recovering Information During A Program Failure," filed Jun. 5, 2000; Inventors: Kevin Joseph Fischer, Eric A. LeVine, Brian T. Hill, Michael R. Marcaelais, Jeffrey Larsson.

U.S. Appl. No. 09/602,284, entitled "Method and System for Reporting Failures of a Program Module In a Corporate Environment," filed Jun. 23, 2000; Inventors: Kirk A. Glerum, Matthew J. Ruhlen.

U.S. Appl. No. 09/602,457, entitled "Method and System for Repairing Corrupt Files and Recovering Data," filed Jun. 23, 2000; Inventors: Kevin Fisher, Robert Coffen, Eric Snyder, Jeff Larsson.

* cited by examiner

METHOD AND SYSTEM FOR REMOTELY CONTROLLING THE REPORTING OF EVENTS OCCURRING WITHIN A COMPUTER SYSTEM

TECHNICAL FIELD

The present invention relates generally to the reporting of events occurring within a computer and, more specifically, remotely controlling the reporting of such events.

BACKGROUND OF THE INVENTION

One of the most important stages in the software development cycle is the debugging stage that occurs after a software product has shipped. This stage is important because the experiences of millions of users of the software product may be utilized during this stage to isolate program errors, identify frequently or infrequently used features, and to generally make the software product better. In order to capitalize on the body of user experience with the software product, however, it is necessary to obtain data from users and to route this data to the software developer.

Prior to the widespread adoption and use of the Internet, it was very difficult for software developers to obtain quality data regarding how a software product performs for a large number of users. Now, however, the Internet connects millions of users with the developers that create and debug the software they use. The Internet, therefore, allows data regarding the operation of a software product to be sent from a computer user to the developer of the product. The data may then be utilized by the developer to fix errors, also called "bugs," in the program, to change the way the program operates by adding or removing features, and to otherwise improve the program. However, current systems for transmitting this data from a user to a software developer suffers from several drawbacks that reduce their effectiveness.

Current systems for reporting data regarding the operation of a software product generate event reports in response to the occurrence of an event within program code. For instance, an event report may be generated when an error occurs in the program code, when an unhandled exception is generated by the program code, when a particular line of code is encountered, or under other circumstances. Data that may assist the developer in understanding the event and in modifying the program code to ensure that it does not occur again is typically included in the event report. For instance, data describing the state of the computer when the event occurred may be included along with other data in the event report.

Although a large number of event reports regarding the occurrence of a particular event may be helpful to a developer in debugging a particular problem, too many reports for a particular problem may be unnecessary. For instance, if a software product is widely distributed and used by millions of users, a particular event occurring within the program may generate event reports from thousands of users. The thousands of event reports would be generated even though only the first ten may be useful to the developer. The rest of the users, other than the first ten, are then pointlessly inconvenienced by affecting the performance of their program and possibly by presenting them with an interrupting dialog box asking them to report the event. Previous systems for reporting the occurrence of events, however, do not have the ability to distinguish which types and particular occurrences of events should be reported.

Additionally, data collection is sometimes possible for an entire class of error conditions. The entire set of error conditions occurring within an application or suite of applications, for instance. However, if the development team responsible for the application is not interested in the entire set of error conditions, but rather only a few, previous systems are unable to report only the few reports that are interesting.

It is with respect to these considerations and others that the present invention has been made.

SUMMARY OF THE INVENTION

In accordance with the present invention, the above and other problems are solved by a method for remotely controlling the reporting of events occurring within a computer that allows fine control over the types of events that are reported. According to the method, a client computer periodically retrieves a remote control file including data identifying one or more events to be reported. When an event occurs, the remote control file is searched for data indicating that the particular type of event should be reported. If data is located within the remote control that indicates that the event should be reported, the client computer collects data describing the event, generates an event report, possibly asks a user for permission to send the event report, and transmits the event report.

In accordance with other aspects, the types of events that may be remotely controlled may include a program assert, a program alert, or other type of events. Additionally, the remote control file may include data that identifies additional data to be collected describing the event when the event occurs. When an event occurs, the remote control file is consulted to identify the type of data that should be collected. The data may then be collected contemporaneously with the occurrence of the event and queued for transmission at a later time. Moreover, the remote control file may also include data identifying a date and time after which the occurrence of a particular event should not be reported. When an event occurs, the remote control file is consulted to determine whether the date and time after which the occurrence of a particular event should not be reported has expired. If the time has expired, the data regarding the event is not collected and the event is not reported.

In accordance with yet other aspects, the present invention relates to a system for remotely controlling the reporting of events occurring with a computer. The system includes a server computer operative to store a remote control file comprising data identifying one or more events that should be reported when they occur. The server computer is also operative to receive periodic requests from a client computer for the remote control file and to transmit the remote control file to the client computer in response to the requests. The server computer is also operative to receive event reports from the client computer.

The system also includes a client computer operative to periodically request and receive the remote control file from the server computer. The client computer is also operative to determine whether an event has occurred. If the client computer determines that an event has occurred, the client computer consults the remote control file to determine whether the particular event should be reported. If the event should be reported, the client computer is operative to gather information specified by the remote control file and to transmit the file to the server computer.

In accordance with still other aspects, the present invention relates to a data structure comprising a first table storing data identifying an instance of a first type of event that should be reported when the first type of event occurs. The data structure also includes a second table storing data identifying an instance of a second type of event that should be reported when the second type of event occurs. The data structure may also include data identifying a version number for a program module in which the first or second type of event has occurred. Additionally, the first and second tables may include data identifying a date and time after which an event occurring corresponding to an entry in the table should not be reported.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computer system and encoded with a computer program of instructions for executing a computer process.

These and other various features as well as advantages which characterize the present invention will be apparent from a reading of the following detailed description and a review of the associated drawings.

DETAILED DESCRIPTION OF THE INVENTION

Figure 1:
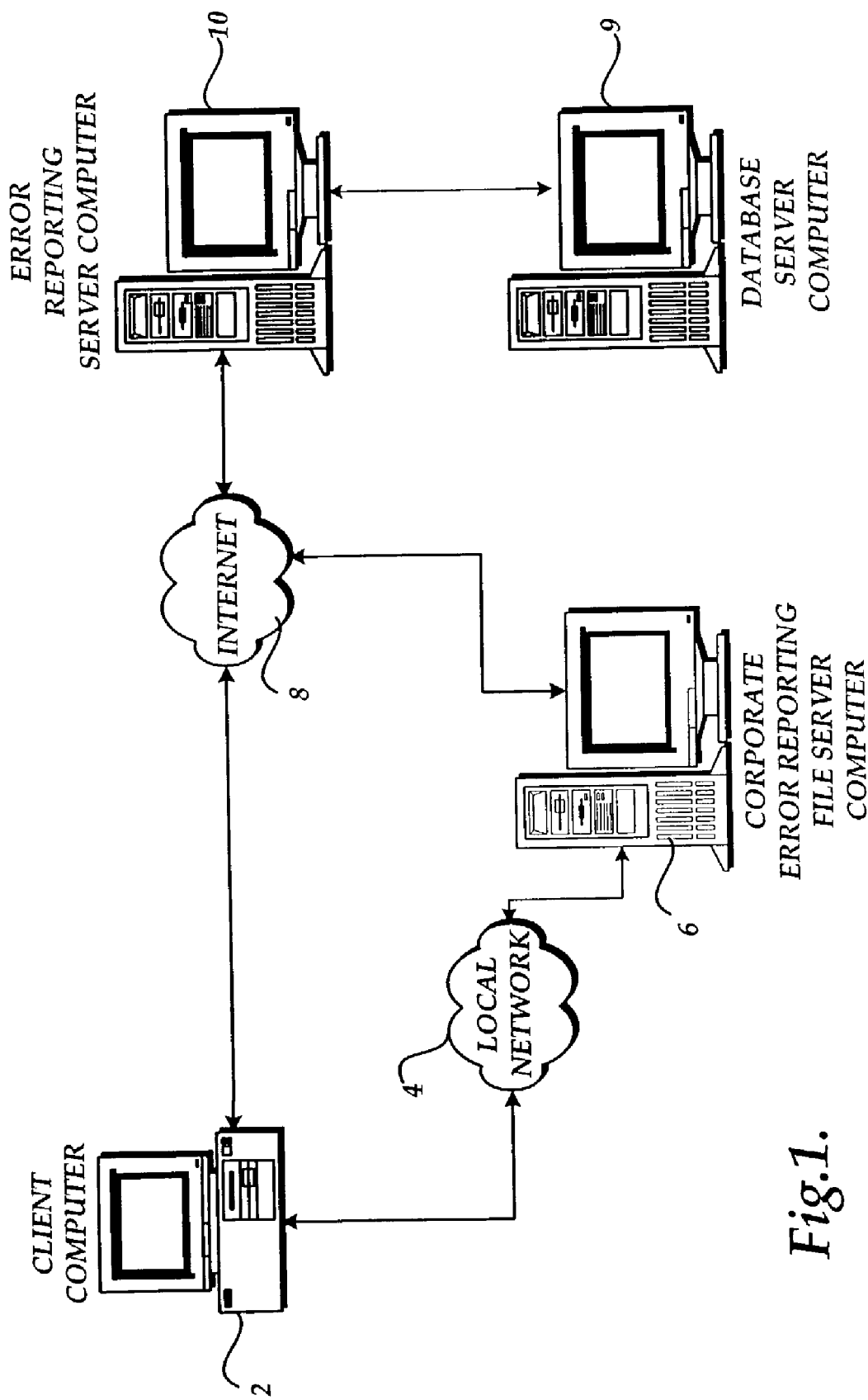
FIG. 1 is a network diagram showing an illustrative operating environment for various embodiments of the invention.

Referring now to the drawings, in which like numerals represent like elements through the several figures, aspects of the present invention and the illustrative operating environment will be described. In particular, FIG. 1 shows an illustrative operating environment for various embodiments of the present invention. As shown in FIG. 1, a client computer 2 is utilized in the various embodiments of the invention. The client computer comprises a standard desktop or server computer that may be used to execute one or more program modules. The client computer 2 is also equipped with program modules for generating error reports in response to events occurring within the client computer 2. Event reports may be generated in response to unhandled exceptions, asserts, program alerts, program errors, and other types of events.

As will be described in greater detailed below, the client computer 2 is also operative to transmit the error reports to a corporate error reporting ("CER") file server computer 6 available through a local area network ("LAN") 4. The CER file server computer 6 comprises a server computer maintained and accessible through the LAN 4 to the client computer 2. The CER file server computer 6 receives the error reports from the client computer 2, stores the reports, and may subsequently forward the error reports to the error reporting server computer 10. A policy may be set at the client computer 2 instructing the client computer 2 to transmit error reports to the CER file server computer 6.

A policy also may be set at the client computer 2 instructing the client computer 2 to transmit error reports through the Internet 8, or other type of distributed computing network, to the error reporting server computer 10. The error reporting server computer 10 comprises a server computer maintained typically by a developer of the software application or other type of program for receiving error reports. The error reports may assist the developer in correcting errors occurring within the client computer 2.

As will also be described in greater detail below, the client computer 2 is also operative to periodically retrieve from the error reporting server computer 10 a remote control file that identifies to the client computer 2 the particular events that should be reported. The remote control file also identifies to the client computer 2 the type of data that should be collected when an event occurs. Moreover, the remote control file identifies to the client computer 2 a date and time after which data should not be collected for each particular event.

As will be described in greater detail below, the client computer 2 periodically retrieves the remote control file from the error reporting server computer 10. When a reportable event occurs within the client computer 2, the client computer 2 consults the remote control file to determine if the event should be reported. If the event is to be reported, the client computer 2 stores data identified by the remote control file contemporaneously with the occurrence of the event. The data is then queued as an event report for subsequent transmission to the error reporting server computer 10. Additional details regarding the format and structure of the remote control file and the functions performed by the client computer 2 when utilizing the remote control file to report events will be described in greater detail below.

Figure 2:
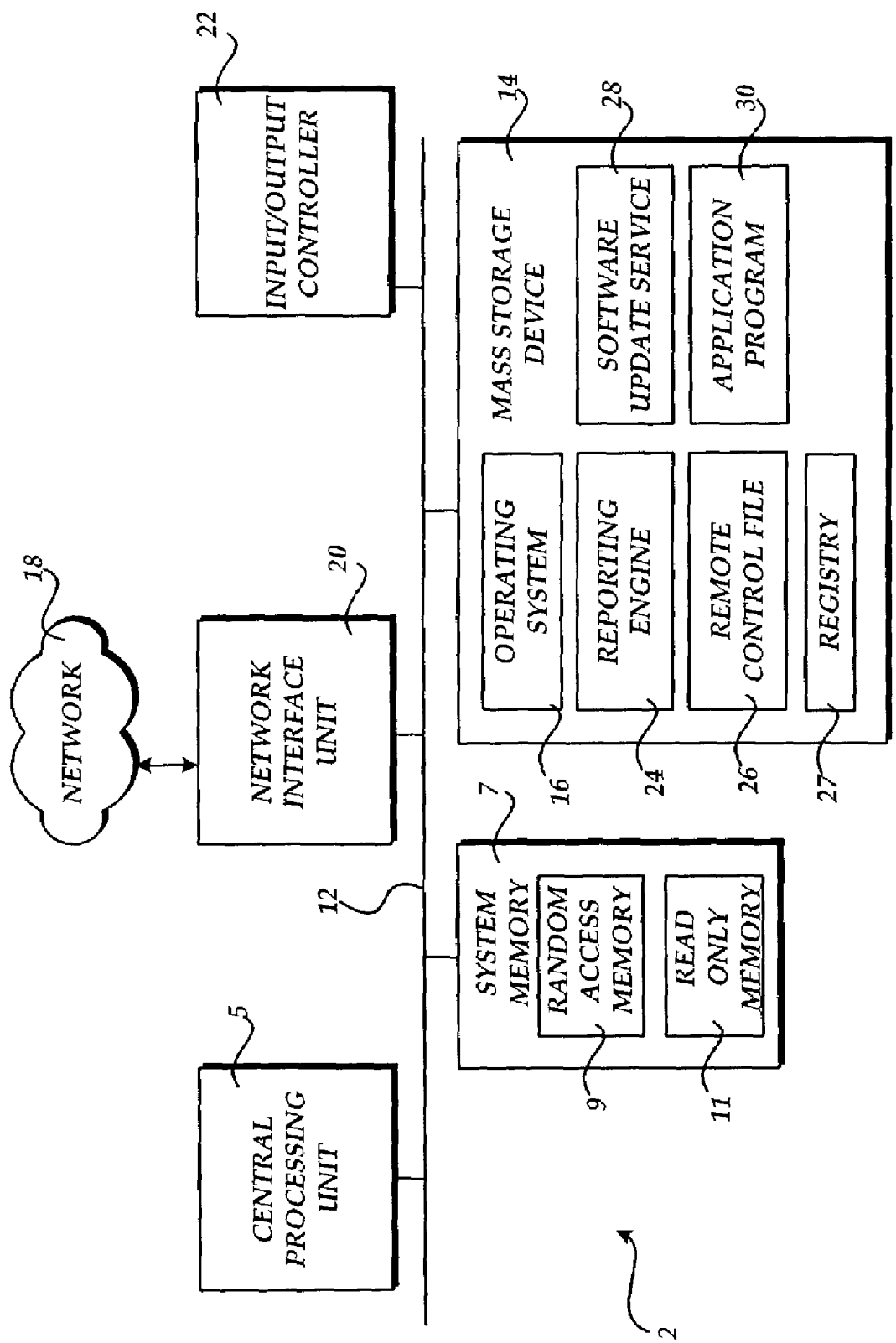
FIG. 2 is a computer architecture diagram showing a computer architecture for a client computer provided by various embodiments of the invention.

FIG. 2 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 2, an illustrative computer architecture for a client computer 2 for practicing the various embodiments of the invention will be described. The computer architecture shown in FIG. 2 illustrates a conventional desktop or server computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The client computer 2 further includes a mass storage device 14 for storing an operating system 16, application programs, and program modules for reporting events occurring within the client computer 2.

The mass storage device 14 is connected to the CPU 5 through a mass storage controller (not shown) connected to the bus 12. The mass storage device 14 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the client computer 2 may operate in a networked environment using logical connections to remote computers through a network 18, such as the Internet. The client computer 2 may connect to the network 18 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 2). Similarly, an input/output controller 22 may provide output to a display screen, a printer, or other type of output device.

As mentioned briefly above, a number of program modules and data files may be stored in the mass storage device 14 and RAM 9 of the client computer 2, including an operating system 16 suitable for controlling the operation of a networked computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a reporting engine program module 24. The reporting engine 24 contains functionality for generating error reports, queuing the error reports, and transmitting the error reports to either the CER file server 6 or the error reporting server computer 10. The reporting engine 24 may be utilized to perform these functions in response to an error or other type of event occurring within the operating system 16 or within an application program. Moreover, the reporting engine 24 may be utilized to perform these functions in response to other types of events such as the execution of a particular line of code on the CPU 5. The reporting engine 25 may also be explicitly called to perform some of its functions, such as dequeueing stored error reports.

The mass storage device 14 and RAM 9 may also include an application program 30. As known to those skilled in the art, the application program 30 may provide functionality for performing a variety of different functions such as word processing, creating and editing spreadsheets, and a virtually unlimited number of other types of functions. According to the embodiment of the invention described herein, the application program 30 is also operative to determine whether a reportable event has occurred during its execution. In response to determining that a reportable event has occurred, such as an assert or a program alert, the application program 30 is then operative to consult a remote control file 26 to determine whether the event should be reported. If the event is to be reported, the application program 30 will collect data identified by the remote control file 26 as an event report. The application program 30 will then call the reporting engine 24 to report the event in a queued mode of operation. Additional details regarding the operation of the application program 30 and its use of the remote control file 26 will be described in greater detail below.

According to one embodiment of the invention, the mass storage device 14 and RAM 9 also include a software update service program 28. As known to those skilled in the art, the software update service 28 comprises an executable program that is operative to periodically execute on the computer 2 and to determine whether various parts of the software stored on the computer 2 should be updated. The software update service 28 makes this determination by contacting an error reporting server computer 10 or other type of server computer via the Internet 8. If updates exist for various software components stored on the client computer 2, the software update service 28 is operative to retrieve these software components and store them on the mass storage device 14.

In the embodiments of the invention described herein, the software update service 28 is operative to periodically contact the error reporting server computer 10 to determine whether an updated version of the remote control file 26 is available. If an updated file is available, the software update service 28 retrieves the file and stores it in a location accessible to the application program 30. Additional details regarding the operation of the software update service 28 will be provided below with respect to FIG. 5.

According to one embodiment of the invention, the mass storage device 14 is also operative to store a registry 27. As known to those skilled in the art, the registry 27 comprises a non-volatile storage location for maintaining parameters and other flags regarding the operation of the operating system 16, the application program 30, and other software components executing on the computer 2. As will be described in greater detail below, the registry 27 is utilized herein to store flags relating to the location of the remote control file 26 and the time and date on which the software update service 28 should check for an updated version of the remote control file 26.

As described briefly above, the application program 30 is configured to identify various types of events and to call the reporting engine 24 in response to the occurrence of these events. For instance, the application program 30 may be configured to call the reporting engine 24 in response to the occurrence of an assert. As known to those skilled in the art, an assert comprises a line of code placed within the program code of the application program 30 that, when executed, identifies a potential error condition. Asserts may be uniquely identified within the application program 30, or across two or more application programs, to uniquely identify the assert that has occurred. By transmitting data regarding the occurrence of the assert through the reporting engine 24 to the error reporting server computing 10, a developer of the application program 30 can troubleshoot, and potentially correct, problems within the application program 30.

As described briefly above, the application program 30 is configured to also identify the occurrence of a program alert. In response to the occurrence of a program alert, the application program 30 may be configured to call the reporting engine 24. As known to those skilled in the art, a program alert, also called an error message, is a modal dialog box which interrupts a user of the computer 2 and asks for some sort of input. For instance, a user may be asked whether they want to save changes in a document, maybe notified that a document could not be opened, or that a particular piece of data could not be located. It should be appreciated that program alerts may be generated in response to error conditions, but may also be generated in order to receive data from a user or to notify a user of a particular condition. In one specific embodiment of the invention described herein, program alerts comprise those messages which go through the LDoAlertTFCWAHrEx function utilized in the MICROSOFT OFFICE family of application programs provided by the MICROSOFT CORPORATION, of Redmond, Wash.

Figure 3:
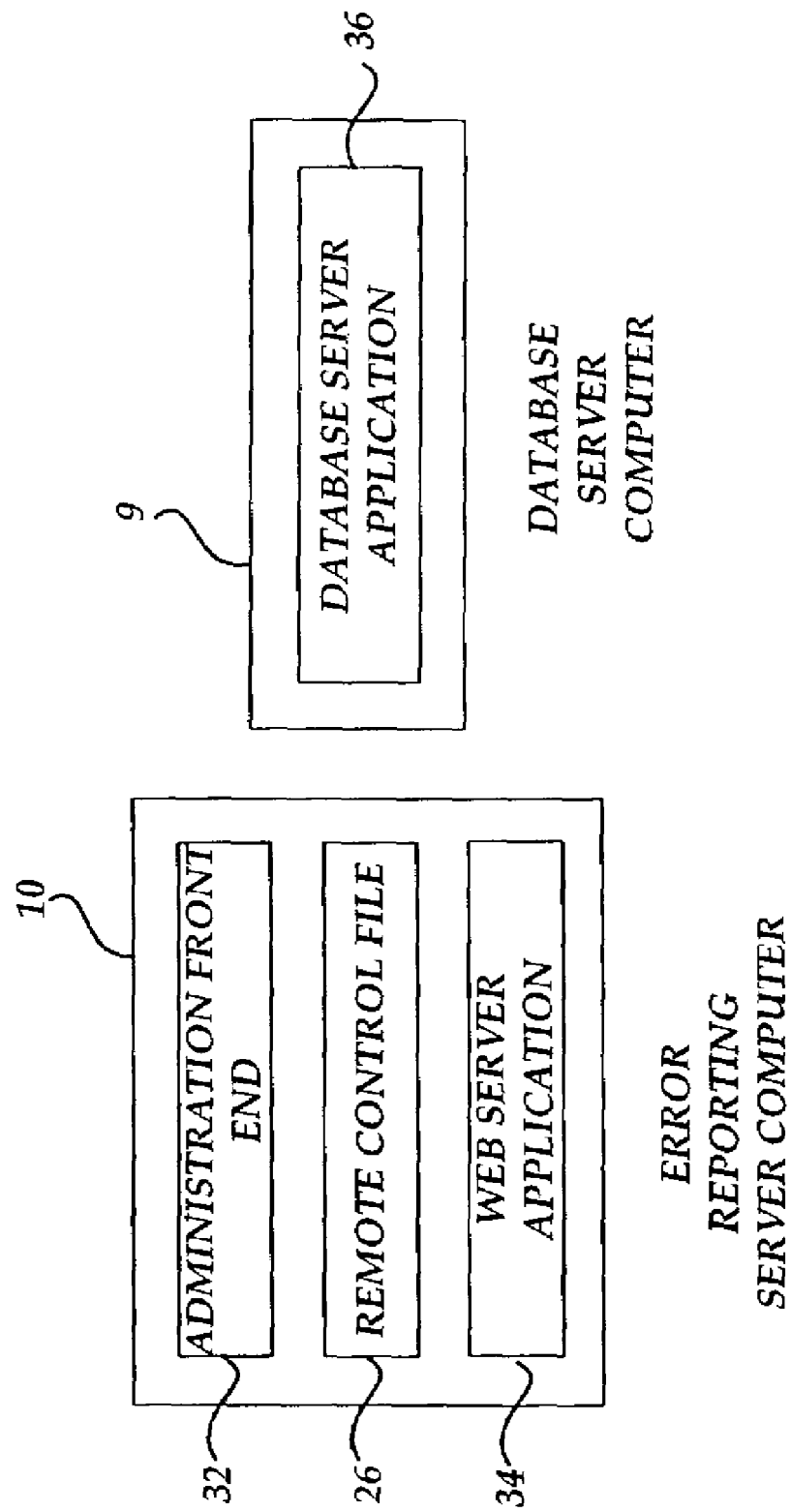
FIG. 3 is a software architecture diagram showing various software components utilized by an error reporting server computer and a database server computer provided according to various embodiments of the invention.

Turning now to FIG. 3, various software components utilized by the error reporting server computer 10 and the database server computer 9 will be described. In particular, as shown in FIG. 3, the error reporting server computer 10 maintains a remote control file 26. As discussed briefly above, the remote control file 26 is periodically retrieved from the error reporting server computer 10 by the client computer 2. Additional details regarding the format and structure of the remote control file will be provided below with respect to FIG. 4.

The error reporting server computer 10 also includes a Web server application 34. As known to those skilled in the art, the Web server application 34 is operative to receive and respond to requests for Web pages located on or accessible to the error reporting server computer 10. In one embodiment, the Web server application 34 is operative to provide access to an administration front end Web site 32. The administrative front end Web site 32 comprises a Web site accessible typically to developers of the application program 30 for customizing the contents of the remote control file 26. In particular, through the administrative front end 32, a developer may specify the types of errors or other events that should be reported by the application program.

The administration front end 32 may also allow a developer to specify the type of data that should be provided when an event occurs, and a date and time after which an event should not be reported. The data provided by the developer through the administration front end 32 may be communicated to the database server application 36 and stored in a database. A batch file process may also be provided for periodically generating a remote control file 26 from the database. The remote control file 26 may then be moved from the database server computer 9 to the error reporting server computer 10, where it is made available to the client computer 2. It should be appreciated that the various functions described herein as being performed by the error reporting server computer 10 and the database server computer 9 may be performed by the same computer system or by other systems not shown or described in FIG. 3.

Figure 4:
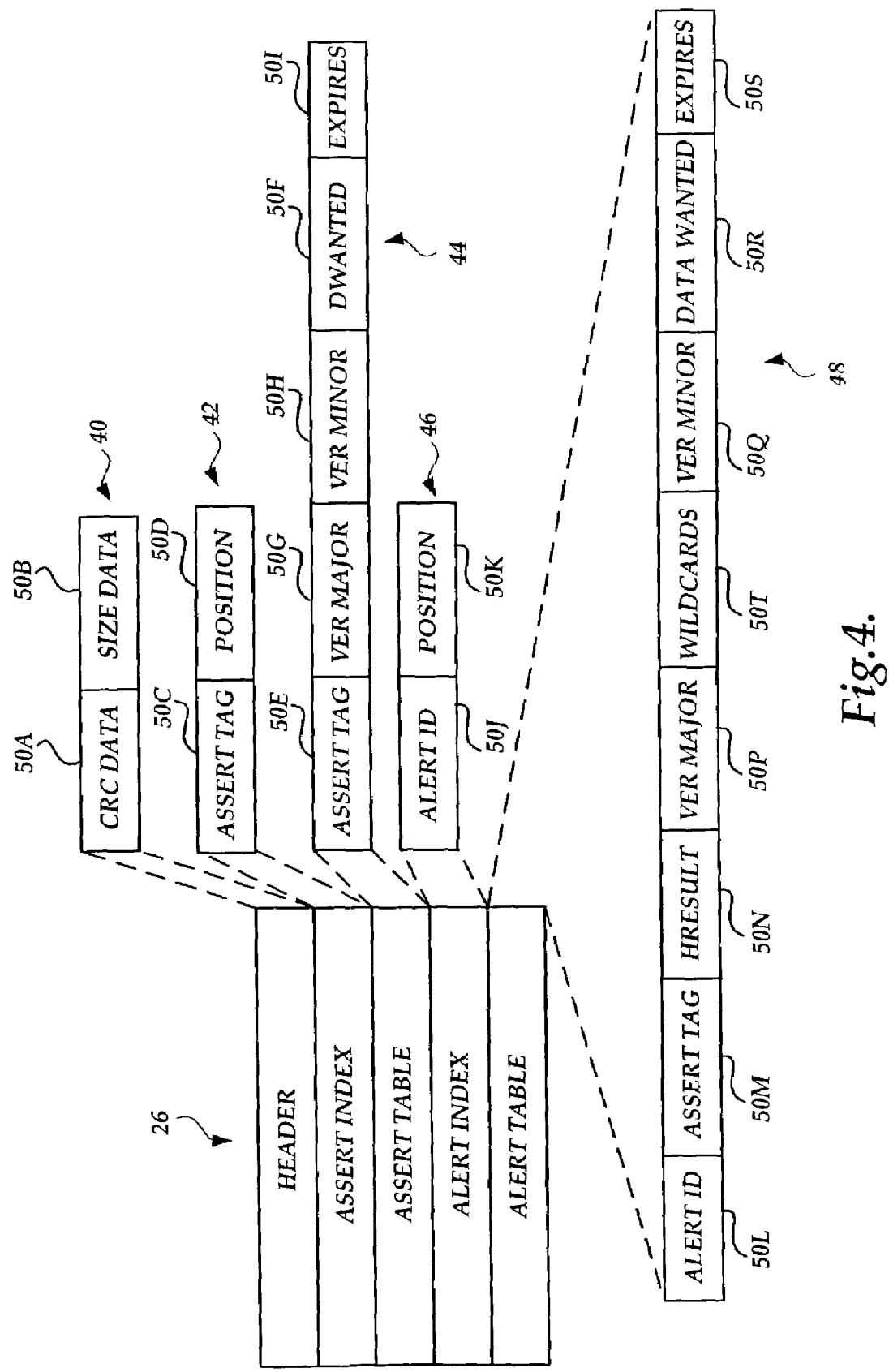
FIG. 4 is a data structure diagram illustrating the structure of a remote control file utilized in the various embodiments of the present invention.

Turning now to FIG. 4, additional details regarding the structure and contents of the remote control file 26 will be described. As shown in FIG. 4, the remote control file 26 comprises a header 40, an assert index 42, an assert table 44, an alert index 46, and an alert table 48. It should be appreciated that the remote control file 26 described herein is configured for remotely controlling the reporting of program asserts and program alerts. However, it should be appreciated that the format and structure of the remote control file 26 may be extended and applied to the remote control of reporting for any type of event.

As shown in FIG. 4, the header 40 includes cyclic redundancy check ("CRC") data 50A and size data 50B. As will be discussed in greater detail below, prior to utilizing the remote control file 26, a determination is made as to whether the component parts of the remote control file 26 are valid. This is performed by generating a CRC value for each of the component parts of the remote control file 26 and comparing the CRC data 58 to the generated CRC. Additionally, the sizes of the component parts of the remote control file 26 are identified and compared to the size data 50B. The remote control file 26 may be utilized if the CRC data 50A and the size data 50B match the generated CRC and size, respectively. If the CRC and size do not match, the remote control file 26 may be corrupt and is therefore not utilized.

The assert index 42 includes an assert tag field 50C and a position field 50D. The assert tab field 50C identifies a particular assert tag. As discussed above, asserts are identified by unique tags to identify the assert within an application or across multiple applications. The position field 50D identifies the location of the corresponding assert tag within the assert table 44. As will be described in greater detail below, the contents of the assert index 42 may be utilized to quickly locate a portion of the assert table 44 that may contain a desired entry.

The assert table 44 includes an assert tag field 50E, a data wanted field 50F, a major version field 50G, a minor version field 50H, and an expires field 50I. The assert tag field 50E includes the assert tags for each assert that should be reported. For each entry in the assert tag field 50E, the data field 50F identifies the type of data that should be collected when the assert occurs. In particular, the data wanted field 50F may identify that a minidump be collected, that a minidump sanitized to remove personally identifiable information (called a "microdump" herein) be collected, or that the minidump along with a heap should be collected.

The major version field 50G and minor version field 50H include version numbers for a software application program 30 in which the assert identified by the corresponding assert tag 50E must be generated. In this manner, asserts generated within different versions of the same application program 30 may be configured to generate different types of event reports. Alternatively, versions of the application program 30 may be configured so that one version generates an event report while another version of the application program 30 does not generate an event report for the same assert.

The assert table 44 also includes an expires field 50I. The expires field 50I includes a date and time after which the assert identified by the corresponding assert tag 50E should not be reported. As will be discussed in greater detail below, the expires field 50I is consulted prior to reporting the occurrence of an assert. If the date and time specified in the expires field 50I have expired, the assert will not be reported. The expires field 50I is useful to prevent reporting of events after which corresponding event reports would not be useful.

As discussed briefly above, the remote control file 26 is configured to remotely control the reporting of program alerts. As known to those skilled in the art, a program alert is generated when an error condition is encountered by the program. Typically, a user interface dialog box or other type of notification is provided to the user at the time the alert occurs. In order to remotely control the reporting of alerts, each alert is assigned a unique alert identifier. The alert identifier uniquely identifies the occurrence of a particular program alert in a given application or a cross multiple application.

The alert index 46 stores an alert identifier field 50J and a position field 50K. The position field 50K identifies the position within the alert table 48 of the alert identifier specified in the field 50J. As will be discussed in greater detail below, by consulting the alert index 46 prior to searching the alert table 48, a desired alert identifier may be located quickly.

The alert table 48 includes an alert identifier 50L, an assert tag field 50M, an hresult field 50N, a major version field 50P, a minor version field 50Q, a data wanted field 50R, and an expires field 50S. When an alert is generated, the alert table 48 is consulted to determine whether the alert should be reported. If the alert that has occurred matches an entry in the alert identifier field 50L, the alert may be reported. Additionally, the circumstances under which an alert may be reported may be limited by consulting the contents of the assert tag field 50M and the hresult field 50N. The assert tag field 50M stores data regarding the last assert that occurred prior to the generation of the program alert. The hresult field 50M includes an error code that may be returned by a function. By reporting an alert only when the contents of the fields 50L, 50M, and 50N correspond exactly to the generated alert or wildcard values are set, the circumstances under which reporting occurs may be narrowed to a very specific event.

The alert table 48 also includes a major version field 50P and a minor version field 50Q. As with the major version field 50G and the minor version field 50H described above, these fields allow the same alert occurring in different versions of an application program 30 to be reported differently. The alert table 48 also includes a data wanted field 50R. If the corresponding alert identifier is to be reported, the data wanted field 50R specifies whether a microdump, a minidump, or a minidump and a heap should be collected when the event occurs. Moreover, the alert table 48 includes an expires field 50S that defines a date and time after which corresponding alert identifiers should not be reported.

It should be appreciated that the fields 50M and 50N may be populated with wildcards. As known to those skilled in the art, a wildcard indicates that the contents of a particular field matches all possible entries. For instance, a particular assert tag may be specified in the assert tag field 50M. The field 50N may then be populated with a wildcard. In this manner, an assert occurring matching the contents of the assert tag 50M will be reported regardless of the hresult. The wildcards field 50T may specify whether wildcards are used. Additional details regarding the use of the remote control file 26 for reporting the occurrence of events will be described in greater detail below with respect to FIGS. 6–9.

Figure 5:
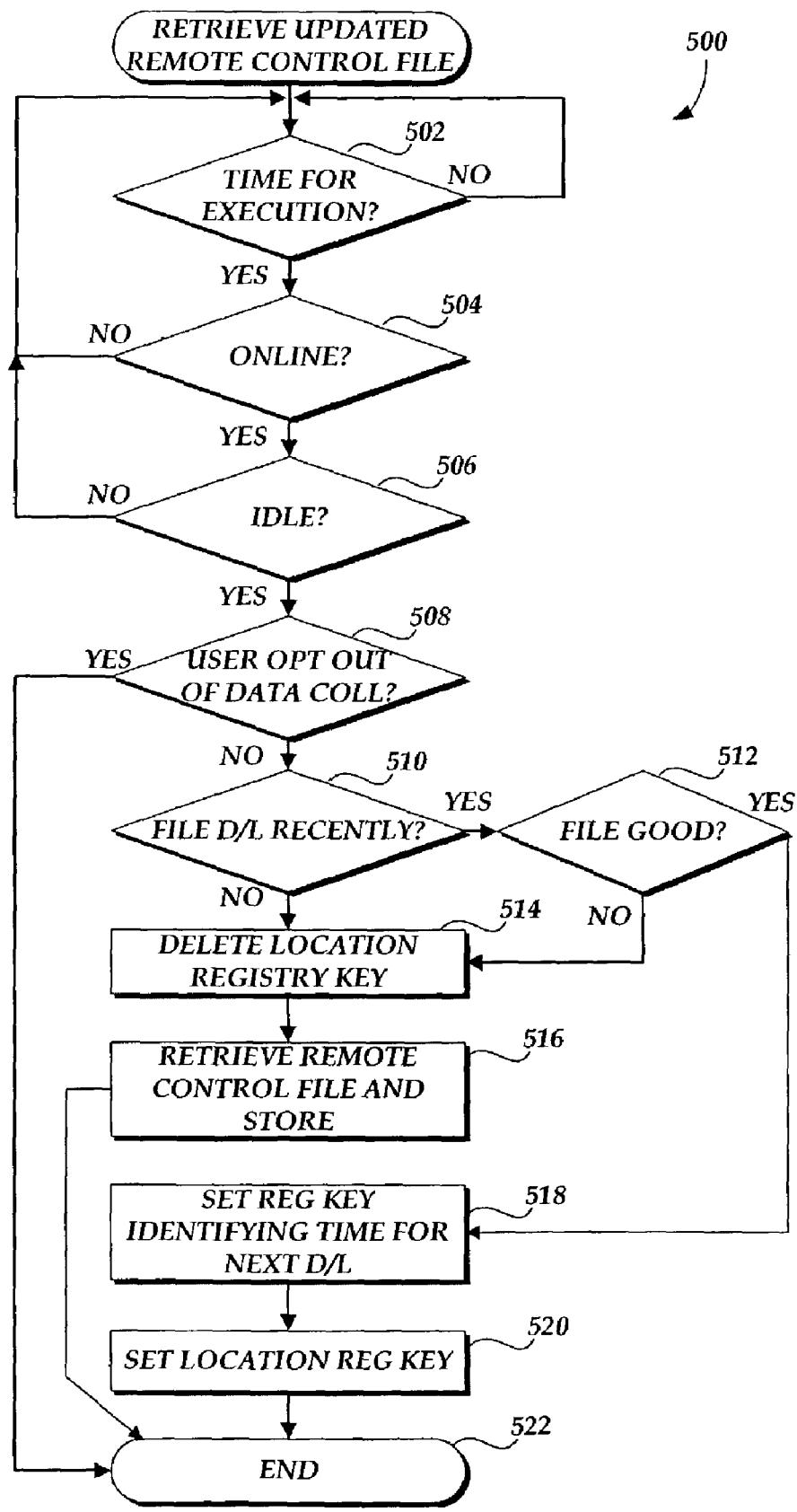
FIG. 5 is a flow diagram illustrating a process for periodically retrieving an updated remote control file utilized by a client computer in various embodiments of the invention.

Referring now to FIG. 5, an illustrative routine 500 will be described illustrating the operation of the software update service 28. As described briefly above, the software update service 28 is operative to periodically execute and download an updated version of the remote control file 26 if one is available. Accordingly, the routine 500 begins at block 502, where a determination is made as to whether the current time maintained by the client computer 2 is the appropriate time for the software update service 28 to execute. The software update service 28 maybe configured to execute by specifying a key in the registry 27. If the current time is not the time for execution, the routine 500 branches back to 502. If, however, the current time is the time for execution, the software update service 28 is executed and the routine 500 continues to block 504.

According to one embodiment of the invention, the software update service 28 only performs its functions if the client computer 2 is online and connected to a network 18 and the client computer 2 is idle. In this manner, a check for an updated remote control file 26 will only be performed if a network connection is available and if the computer is not performing other functions. Accordingly, at block 504, a determination is made as to whether the client computer is online. If the client computer is not online, the routine 500 branches back to block 502. If the client computer is online, the routine 500 continues to block 506 where a determination is made as whether the client computer is idle. If the client computer is not idle, the routine 500 branches back to block 502. However, if the client computer 2 is idle, the routine 500 continues to block 508.

At block 508, a determination is made as to whether the current user of the client computer 2 has indicated that they would not like data collected on the client computer 2. As discussed above, a user of the client computer 2 or an administrator may set a policy indicating that data not be collected. If such a policy has been set, the routine 500 branches from block 508 to block 522. It no such policy has been set, the routine 500 continues from block 508 to block 510.

At block 510, a determination is made as to whether the remote control file 26 has been downloaded recently. If the file has been downloaded recently, the routine 500 branches to block 512. At block 512, a determination is made as to whether the remote control file 26 is corrupted. This determination may be made based on verification of a digital signature or file size checks on the remote control file 26. If the file is not corrupted, there is no need to download an updated version of the remote control file 26. Accordingly, the routine 500 branches from block 512 to block 518, described below. However, if the file is corrupted, the routine 500 continues to block 514.

If, at block 510, it is determined that an updated remote control file 26 has not been downloaded recently, the routine 500 continues to block 514. At block 514, a key stored in the registry 27 identifying the location of the current remote control file 26 is deleted. By requiring accesses to the remote control file 26 to be made utilizing this key, and removing the key prior to downloading a new remote control file 26, accesses to the remote control file 26 while a new version is being downloaded can be avoided.

From block 514, the routine 500 continues to block 516, where the software update service 28 retrieves an updated version of the remote control file 26 from the error reporting server computer 10. A time period may also be set to elapse prior to downloading the updated version of the remote control file. The software update service 28 stores the updated version of the remote control file 26 within the mass storage device 14. Once the updated remote control file 26 has been stored, the routine 500 continues to block 522, where it ends.

At block 518, a registry key identifying the time for downloading the next version of the remote control file 26 is set. The routine 500 then continues to block 520 where the software update service 28 resets the key contained in the registry 27 that identifies the location of the updated remote control file 26. The routine 500 then continues from block 520 to block 522, where it ends.

Figure 6:
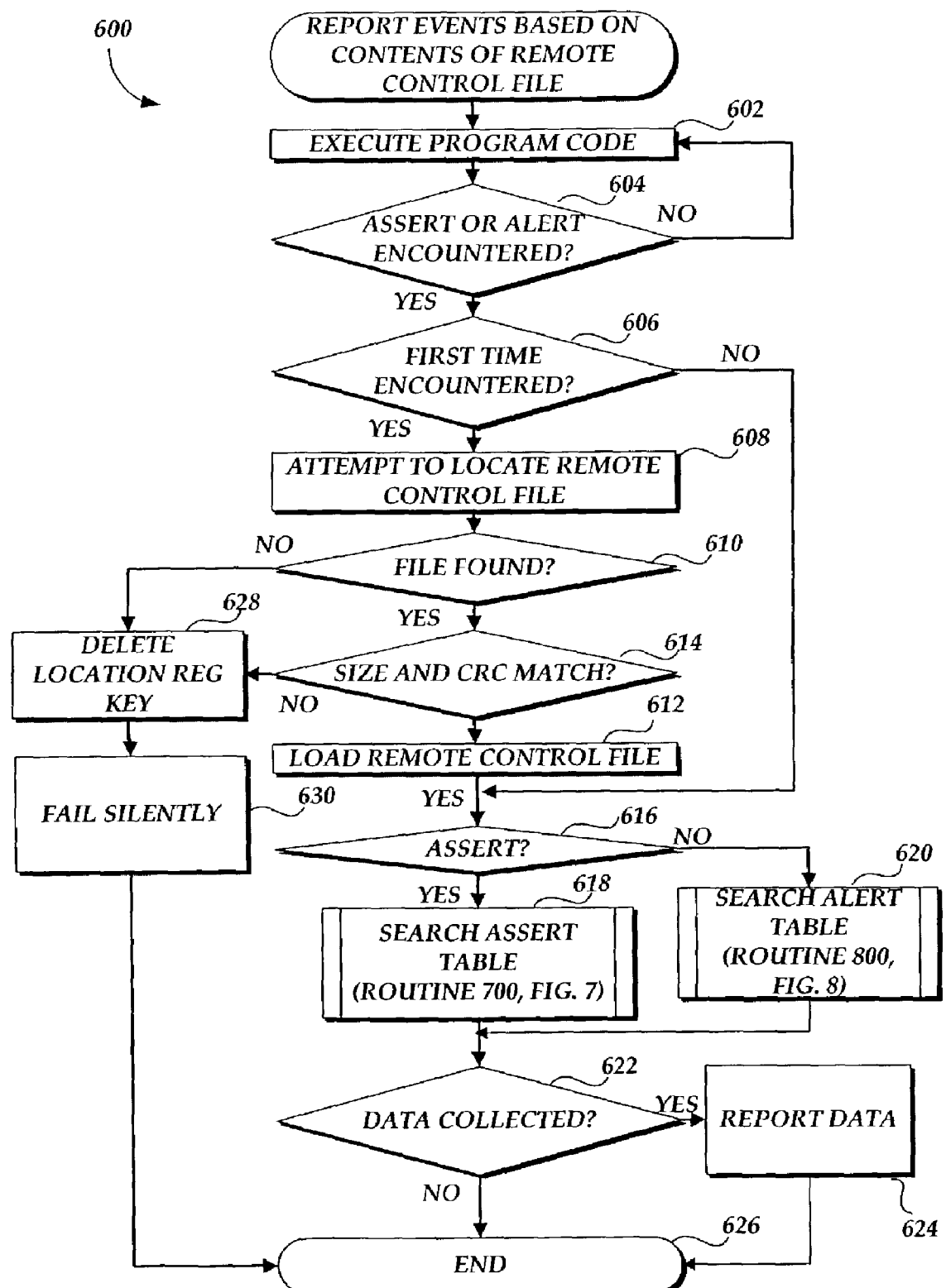
FIG. 6 is a flow diagram illustrating a routine for reporting the occurrence of events based on the contents of a remote control file as provided in one embodiment of the invention.

Referring now to FIG. 6, an illustrative routine 600 will be described for reporting events based on the contents of the remote control file 26. It should be appreciated that the functions illustrated in the routine 600 are performed by the application program 30 in the embodiment of the invention described herein. However, it should be further appreciated that the functions shown in FIG. 6 may be performed by other program modules, such as the operating system 16, or other types of program modules.

The routine 600 begins at block 602, where the program code of the application program 30 or other program module is executed. The routine then continues to block 604, where determination is made as to whether a reportable event has occurred. According to the various embodiments of the present invention described herein, a reportable event may comprise either the occurrence of an assert or the occurrence of a program alert. If either an assert or a program alert has occurred, the routine 600 continues from block 604 to block 606. If no reportable event has occurred, the routine 600 branches back to block 602 where the execution of the program code continues.

At block 606, a determination is made as to whether the occurrence of the event is the first occurrence of an event since the program module has been executing. This determination is made to ensure that the remote control file 26 is only loaded into memory one time during a particular program session. If the event is not the first event that has been encountered, the routine 600 branches from block 606 to block 616. If, however, the event is the first event that has been encountered during the program session, the routine 600 continues to block 608.

At block 608, an attempt is made to locate the remote control file 26 at the location specified by the registry key described above. At block 610, a determination is made as to whether the remote control file 26 was found at the specified location. If the file was not found at the specified location, the routine 600 branches to block 628 where the registry key specifying the location of the remote control file 26 is deleted. The routine 600 then continues from block 628 to block 630 where the routine fails silently. No notification is provided to user that reporting has failed. From block 630, the routine 600 continues to block 626, where it ends.

If, at block 610, the remote control file 26 was located, the routine 600 continues to block 614, where a determination is made as to whether the size and CRC values for each of the component parts of the remote control file 26 match the size specified in the header 40. If the size and CRC do not match, the routine 600 branches to block 628. If, however, the size and CRC do match, the routine 600 continues to block 612, where the remote control file is loaded into memory.

At block 616, a determination is made as to whether the event that has occurred is the occurrence of an assert. If an assert has occurred, the routine 600 continues to block 618 where the assert table is searched for an entry indicating that the assert should be reported. If, at block 616, it is determined that an assert has not occurred, the routine 600 branches to block 620, where the alert table 48 is searched to identify whether or not the alert should be reported. Illustrative routines for searching the assert table and the alert table are described below with reference to FIGS. 7 and 8, respectively.

From blocks 618 and 620, the routine 600 continues to block 622, where a determination is made as to whether data was collected in response to the occurrence of the event. If data has been collected, the routine 600 branches to block 624, where the collected data is reported by the reporting engine 24. From block 624, the routine 600 continues to block 626, where it ends. If, at block 622, a determination is made that no data was collected in response to the occurrence of the event, the routine 600 continues to block 626, where it ends.

Figure 7:
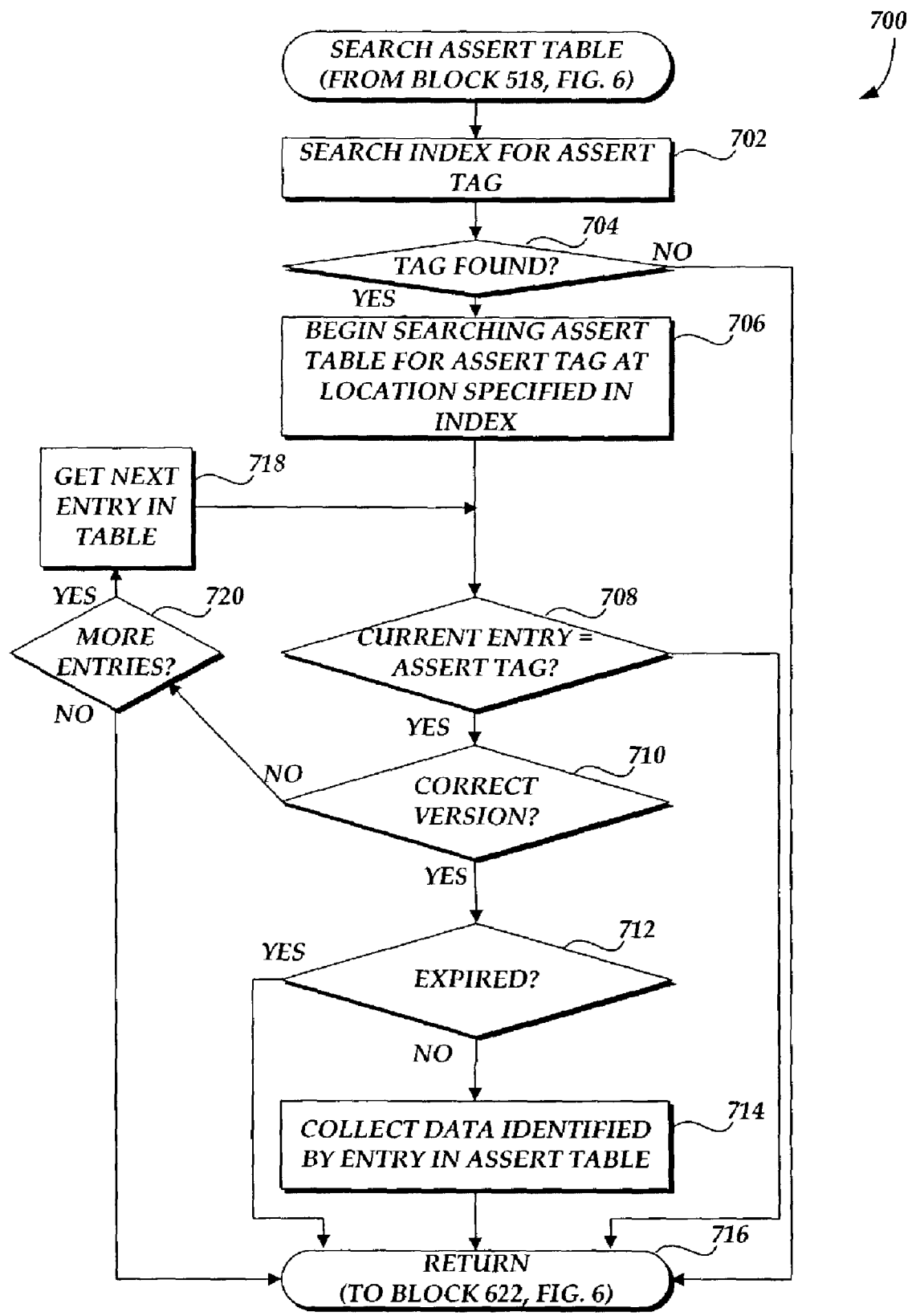
FIG. 7 is a flow diagram illustrating a routine for searching an assert table utilized to identify events that should be reported in one embodiment of the invention.

Referring now to FIG. 7, an illustrative routine 700 will be described for searching the assert table 44. The routine 700 begins at block 702, where the assert tag field 50c of the assert index 42 is searched for an entry having an assert tag identical to the assert that has recently occurred. The routine 700 then continues to block 704, where a determination is made as to whether such a tag was found. If such a tag was not found, the routine 700 branches to block 716, where it returns to block 622. If, however, a matching tag was found, the routine 700 continues to block 706.

At block 706, a search is begun within the assert table 44 for an entry in the assert tag field 50e matching the assert tag for the recently occurring assert. The search is begun at the position within the assert table 44 specified by the position field 50d of the assert index 42. From block 706, the routine 700 continues to block 708, where a determination is made as to whether the current entry in the assert table 44 has an assert tag field 50e matching the assert tag of the recently occurring assert. If the current entry does not match the assert tag, the routine 700 branches to block 716, where the search is finished. If no additional entries remain in the assert table 44 to be searched, the routine 700 branches from block 720 to block 716, where it returns to block 622. If additional entries exist, however, the routine 700 continues to block 718, where the next entry in the assert table is searched.

If, at block 708, a determination is made that the contents of the assert tag field 50e for the current entry matches the assert tag of the recently occurring assert, the routine 700 continues to block 710. At block 710, a determination is made as to whether the application program 30 in which the assert occurred matches the major and minor versions specified in the fields 50g and 50h. If the versions do not match, the routine 700 branches from block 710 to block 720. If, however, the versions match, the routine 700 continues to block 712.

At block 712, the date and time contained in the field 50I is compared to a current date and time maintained by the client computer 2. If the date and time contained in the field 50I is older than the current date and time, the entry in the assert table has expired and data for that entry should not be collected. Accordingly, if the date has expired, the routine 700 branches from block 712 to block 716, where the search is complete. However, if the date has not expired, the routine 700 continues to block 714, where data is collected for the assert as specified by the data wanted field 50F. The collected data is stored in a location accessible to the reporting engine 24. From block 714, the routine 700 continues to block 716, where it returns to block 622, described above with reference to FIG. 6.

Figure 8:
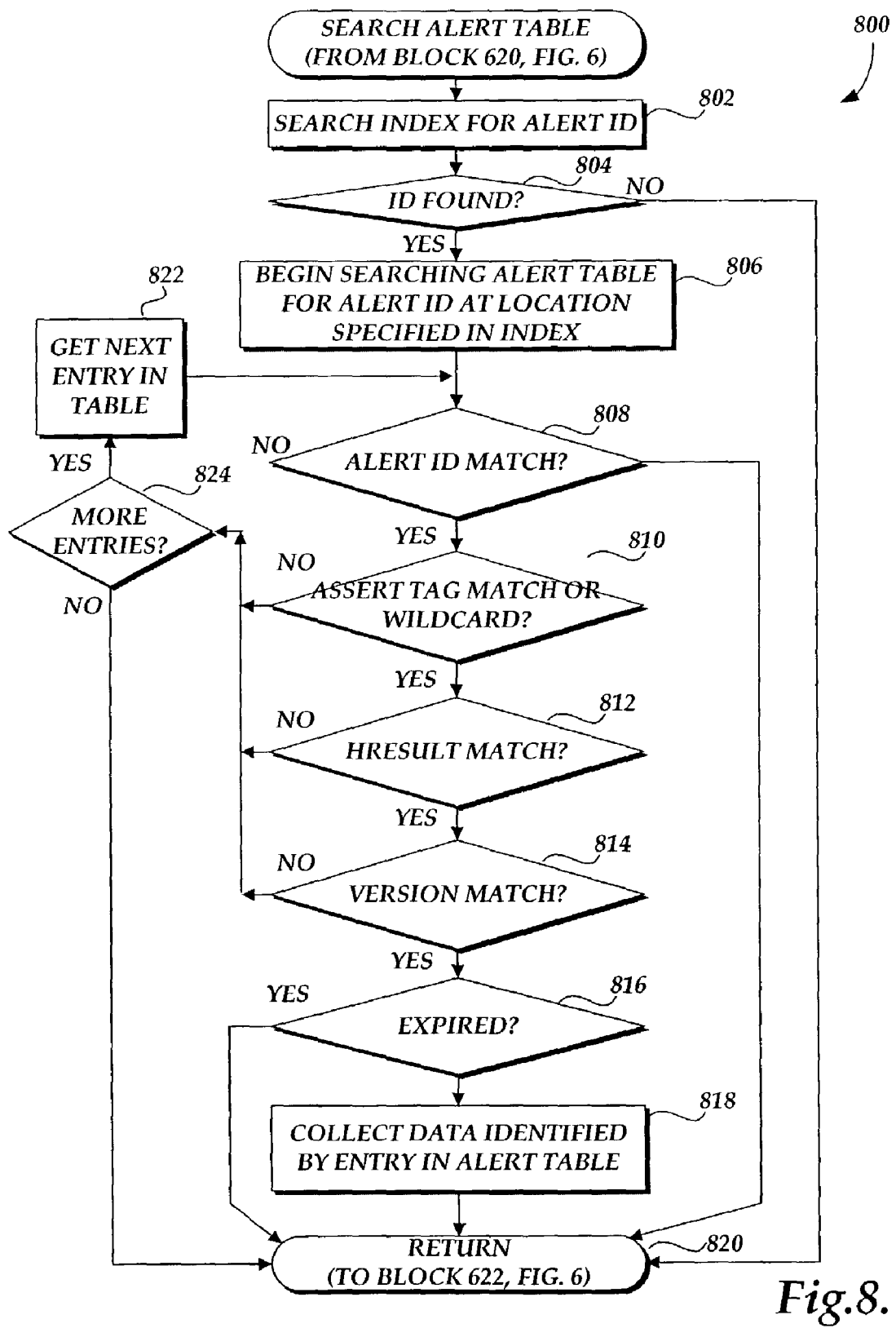
FIG. 8 is a flow diagram illustrating a routine for searching an alert table utilized to identify events that should be reported in one embodiment of the invention.

Referring now to FIG. 8, an illustrative routine 800 will be described for searching the alert table 48 and collecting data regarding the occurrence of an event. The routine 800 begins at block 802, where the alert identifier field 50J is searched for an alert identifier matching the alert of the recently occurring program alert. If no alert identifier is found in the alert index 46, the routine 800 branches to block 820 where it ends. If a matching alert identifier is found in the field 50J, however, the routine 800 continues from block 804 to block 806. At block 806, a search is begun on the alert table 48 at the location specified in the field 50K corresponding to the matching alert identifier in field 50J.

From block 806, the routine 800 continues to block 808, where a determination is made as to whether the alert identifier contained in the field 50L matches the alert identifier of the recently occurring alert. If the alert identifier in the field 50L does not match, the routine 800 branches to block 820, where it returns to block 622.

If, at block 808, it is determined that the alert identifier contained in the field 50L for the current entry matches the alert identifier of the recently occurring alert, the routine 800 continues to block 810. If at block 810, a determination is made as to whether the contents of the assert tag field 50M match the assert tag of the last assert that occurred prior to the program alert or a wildcard. If the contents of the field 50M do not match, the routine 800 branches to block 824. If, however, the contents of the field 50M match the most recently occurring assert, the routine 800 continues to block 812.

At block 812, a determination is made as to whether the contents of the hresult field 50 and match the hresult associated with the most recently occurring program alert or a wildcard. If the hresult does not match, the routine 800 branches to block at 824. If, however, the hresult does match, the routine 800 continues from block 812 to block 814. At block 814, a determination is made as to whether the version of the application program 30 in which the program alert was generated matches the version specified by the fields 50P and 50Q. If the version does not match, the routine 800 branches to block 824. If, however, the versions do match, the routine 800 continues from block 814 to block 816.

At block 816, a determination is made as to whether the date and time specified in the expired fields 50S is later than a current date and time maintained by the client computer 2. If the date is later, the entry in the alert table 48 has expired and the routine 800 branches from block 816 to block 820. If the entry has not expired, the routine 800 continues to block 818, where data is collected regarding the occurrence of the alert as specified in the data wanted field 50R corresponding to the matching entry. The collected data is stored in a location accessible to the reporting engine 24. From block 818, the routine 800 continues to block 820, where it returns to block 622, described above with reference to FIG. 6.

Figure 9:
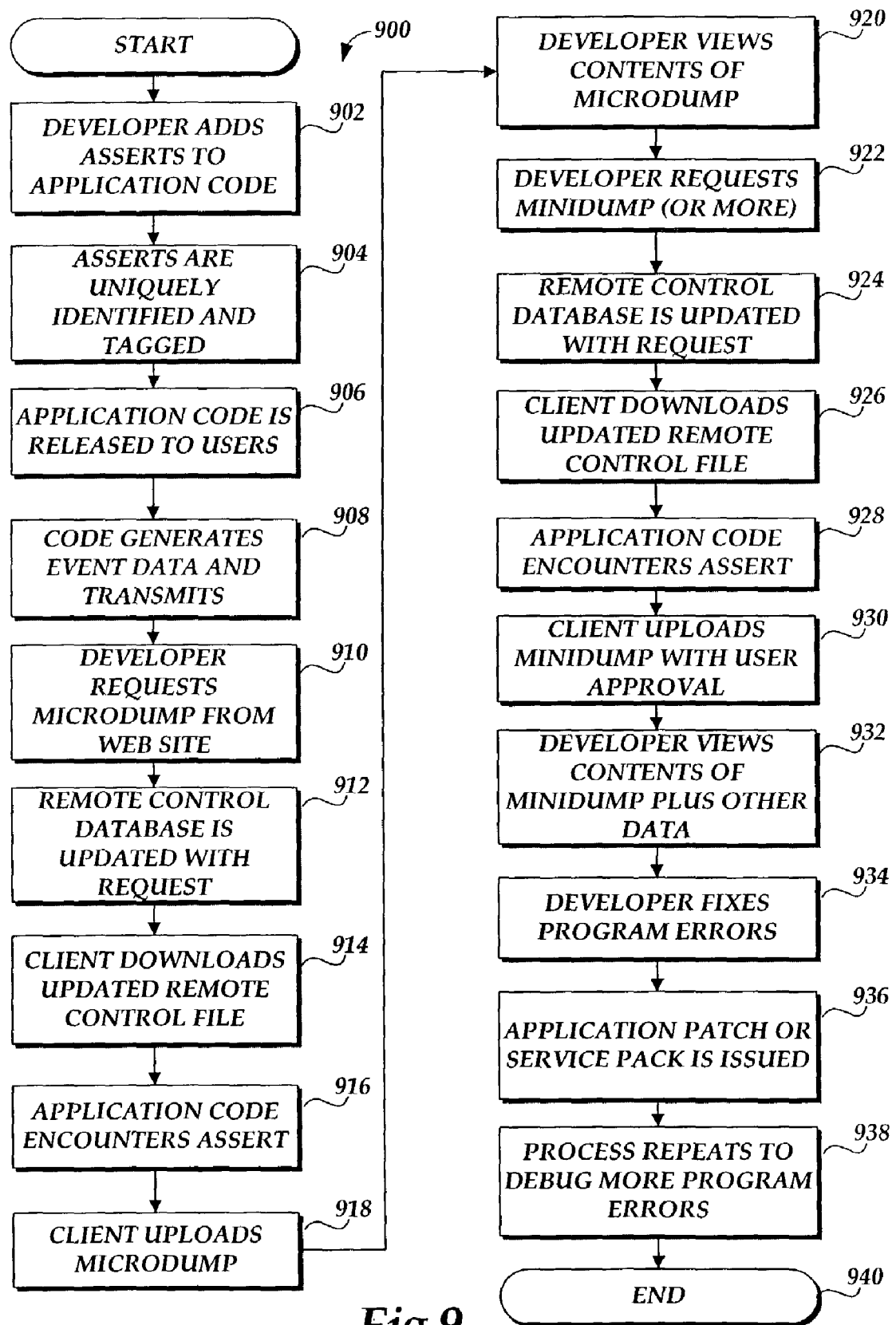
FIG. 9 is a flow diagram illustrating a routine for utilizing remote control of event reporting to debug a software application in one embodiment of the invention.

Referring now to FIG. 9, an illustrative routine 900 will be described illustrating a software development cycle that utilizes the remote control file 26 and the reporting engine 24 to collect information regarding an application program 30 and to utilize that information to debug the application program. The routine 900 begins at block 902, where a developer adds assert code to the application program 30. As known to those skilled in the art, asserts may be implemented utilizing macros in conjunction with a compiler of the application program 30. The routine 900 then continues to block 904, where the asserts are provided unique identifiers. By providing unique identifiers for each assert in either a single application program or multiple application programs, error conditions corresponding to each assert can be uniquely identified.

From block 904, the routine 900 continues to block 906 where the application program 30 is released to users. At block 908, the application program 30 is utilized by the users and may occasionally generate an assert. In response to the occurrence of an assert, the reporting engine 24 may transmit an error report to the error reporting server computer 10 describing the assert. Utilizing the facilities provided by the error reporting server computer 10, the developer may view the error data generated by the application program 30. In order to further debug the application program 30, the developer may request a microdump for the next occurrence of the event from the error-reporting server 10. In order to request such data, the data wanted field 50F is updated in the remote control file 26 for the corresponding assert.

In response to the developer request, the remote control file 26 is updated. At block 914, the software update service 28 downloads the updated remote control file 26 from the error reporting server computer 10. When the assert is subsequently encountered by the application program 30, the remote control file 26 is consulted to determine the type of data that should be reported. As specified by the developer, the microdump is generated and transmitted to the error reporting server computer 10 by the client computer 2 at block 918.

At block 920, the developer may view the contents of the microdump at the error-reporting server 10. If the developer needs additional information, the developer may again modify the contents of the remote control file 26 to indicate that a minidump or additional information be provided in response to the next occurrence of the assert at block 922. At block 924, the remote control file 26 is again updated with the developer's request. At block 926, the client computer 2 downloads the updated remote control file 26. When the assert is again encountered by the application program 30, the reporting engine 24 uploads the requested minidump to the error reporting server computer 10.

At block 932, the developer may view the contents of the minidump or other data generated in response to the most recent occurrence of the assert. At block 934, the developer is able to fix the error that caused the assert to be generated in the application program 30. In particular, the developer may issue a patch to the application program 30 or a service pack that fixes the error. At block 938, the process illustrated by the routine 900 is repeated to debug further errors existing in the application program 30. The routine 900 then continues to block 940, where it ends.

Based on the foregoing, it should be appreciated that the embodiments of the invention provide a method and system for remotely controlling the reporting of events occurring within a computer system. The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method, implemented at least in part by a machine, for remotely controlling the reporting of events occurring within a computer, comprising:

periodically retrieving a remote control file comprising data identifying one or more events to be reported wherein the one or more events comprise the occurrence of an assert being identified across two or more application programs and wherein the data identifying the one or more events to be reported comprises an assert tag uniquely identifying the assert and the program alert;

determining whether an event has occurred based upon the assert tag;

in response to determining that the event has occurred, searching the remote control file for data indicating that the event should be reported;

in response to locating data within the remote control file indicating that the event should be reported, collecting data describing the event; and reporting, to a display, the collected data describing the event in response to locating the data within the remote control file indicating that the event should be reported.

2. The method of claim 1, wherein the remote control file comprises data indicating whether the occurrence of an assert or a program alert should be reported.

3. The method of claim 2, wherein the remote control file further comprises data identifying the data to be collected describing the event, and wherein the method further comprises identifying the data to be collected from the data in the remote control file.

4. The method of claim 3, wherein the remote control file further comprises data identifying a date after which the occurrence of a particular event should not be reported.

5. The method of claim 4, wherein searching the remote control file for data indicating that the event should be reported comprises determining whether the event should be reported based on the date after which the occurrence of the event should not be reported.

6. A computer-readable medium comprising computer-readable instructions which, when executed by a computer, cause the computer to perform the method of claim 1.

7. A computer-controlled apparatus operative to perform the method of claim 1.

8. A system for remotely controlling the reporting of one or more types of events occurring within a computer, the system comprising:

a server computer operative to store a remote control file comprising data identifying one or more events that should be reported when they occur, to receive periodic requests from a client computer for the remote control file, to transmit the remote control file to the client computer in response to the requests, and to receive event reports from the client computer; and a client computer operative to periodically request and receive the remote control file from the server computer, to determine whether an event has occurred, to consult the remote control file to determine if an event that has occurred should be reported, and to report the event to the server computer in response to determining that the event should be reported wherein the events comprise the occurrence of an assert being identified across two or more application programs and wherein the data identifying the one or more events that should be reported comprises an assert tag uniquely identifying the assert.

9. The system of claim 8, wherein the remote control file comprises data indicating whether the occurrence of an assert or a program alert should be reported.

10. The system of claim 9, wherein the remote control file comprises data identifying a date after which the occurrence of an assert or a program alert should not be reported.

11. The system of claim 10, wherein the client computer is operative to determine whether an event that has occurred should be reported by identifying a date in the remote control file after which the event should not be reported, and reporting the event if a current date is previous to the identified date.

12. A computer-readable medium which stores a set of instructions which when executed performs a method for reporting of one or more types of events, the method executed by the set of instructions comprising:

periodically retrieving a remote control file comprising data identifying an instance of a first type of event that should be reported when the first type of event occurs;

storing, in a first table, the data identifying the instance of the first type of event that should be reported when the first type of event occurs wherein the first type of event comprises an assert, and wherein the data identifying an instance of the first type of event comprises an assert tag uniquely identifying the assert, the assert being identified across two or more application programs;

storing, in a second table, data identifying an instance of a second type of event that should be reported when the second type of event occurs; and reporting, to a display, at least one of the following: the instance of the first type of event when it occurs and the instance of the second type of event when it occurs.

13. The computer-readable medium of claim 11, wherein storing in the first table comprises storing in the first table comprising data corresponding to the assert tag identifying additional data that should be collected when the first type of event occurs.

14. The computer-readable medium of claim 13, wherein storing in the first table comprises storing in the first table comprising data identifying a version number for a program module in which the first type of event has occurred.

15. The computer-readable medium of claim 14, wherein storing in the first table comprises storing in the first table comprising data identifying a date after which an event occurring corresponding to the assert tag should not be reported.

16. The computer-readable medium of claim 15, wherein storing, in the second table, data identifying the instance of the second type of event comprises storing, in the second table, data identifying the instance of the second type of event wherein the second type of event comprises the generation of program alert, and wherein the data identifying an instance of the second type of event comprises an alert identifier.

17. The computer-readable medium of claim 16, wherein storing, in the second table, data identifying the instance of the second type of event comprises storing, in the second table, data identifying the instance of the second type of event wherein the data identifying an instance of the second type of event further comprises data identifying an assert encountered just prior to the generation of the program alert.

18. The computer-readable medium of claim 17, wherein storing, in the second table, data identifying the instance of the second type of event comprises storing, in the second table, data identifying the instance of the second type of event wherein the data identifying an instance of the second type of event further comprises data identifying a version number for a program module in which the program alert was generated.

19. The computer-readable medium of claim 18, wherein storing, in the second table, data identifying the instance of the second type of event comprises storing, in the second table, data identifying the instance of the second type of event wherein the data identifying an instance of the second type of event further comprises data identifying a date after which the second type of event should not be reported.

* * * * *